(12) United States Patent
Heinzeroth

(10) Patent No.: US 7,108,108 B1
(45) Date of Patent: Sep. 19, 2006

(54) ROD CLAMPING DEVICE

(76) Inventor: Jerry E. Heinzeroth, 3012 Carefree Dr., Rockford, IL (US) 61114

( * ) Notice: Subject to any disclaimer, the term of this patent is extended or adjusted under 35 U.S.C. 154(b) by 159 days.

(21) Appl. No.: 10/669,488

(22) Filed: Sep. 23, 2003

Related U.S. Application Data

(60) Provisional application No. 60/417,452, filed on Oct. 10, 2002, provisional application No. 60/413,974, filed on Sep. 27, 2002.

(51) Int. Cl.
B65H 59/10 (2006.01)
(52) U.S. Cl. .................. 188/67; 188/69; 188/170; 91/41; 60/593; 409/241
(58) Field of Classification Search ............ 188/67, 188/68, 69, 170, 265; 60/593, 567; 91/41, 91/43, 44; 92/23, 24, 26; 269/32, 309, 310, 269/48.1; 279/2.1, 2.06; 409/231, 241
See application file for complete search history.

(56) References Cited

U.S. PATENT DOCUMENTS

| | | | | |
|---|---|---|---|---|
| 3,034,408 | A | * 5/1962 | Kampmeier | ............. 409/231 |
| 3,397,614 | A | * 8/1968 | Meinke | ............. 409/231 |
| 3,580,135 | A | * 5/1971 | Jones | ............. 409/231 |
| 3,869,002 | A | * 3/1975 | Koenig, III | ............. 173/166 |
| 3,918,346 | A | 11/1975 | Ziegler | |
| 3,995,534 | A | 12/1976 | Rastetter | |
| 4,026,191 | A | * 5/1977 | Blomquist | ............. 409/233 |
| 4,185,539 | A | 1/1980 | Stratienko | |
| 4,222,692 | A | * 9/1980 | Pavlovsky | ............. 409/141 |
| 4,463,481 | A | 8/1984 | Rastetter | |
| 4,526,086 | A | * 7/1985 | Holton et al. | ............. 91/43 |
| 5,137,400 | A | 8/1992 | Sagara | |
| 5,302,062 | A | * 4/1994 | Baba et al. | ............. 409/231 |
| 5,540,135 | A | 7/1996 | Goellner | |
| 5,761,984 | A | 6/1998 | Goellner | |
| 5,791,230 | A | 8/1998 | Goellner | |
| 6,152,268 | A | 11/2000 | Goellner | |
| 6,178,870 | B1 | 1/2001 | Takahashi | |
| 6,471,254 | B1 | * 10/2002 | Russell | ............. 285/338 |
| 6,513,988 | B1 | * 2/2003 | Kurz | ............. 384/605 |
| 6,598,713 | B1 | * 7/2003 | Kawakami | ............. 188/67 |
| 6,886,822 | B1 | * 5/2005 | Kawakami | ............. 269/309 |

* cited by examiner

OTHER PUBLICATIONS

Name of author unknown: Catalog entitled, "Amlok—Hydraulic Squeeze Bushing" distributed by Advanced Machine & Engineering Co., of Rockford, Illinois: Catalog No. SMB/AMB-9303.

*Primary Examiner*—James McClellan
*Assistant Examiner*—Mariano Sy
(74) *Attorney, Agent, or Firm*—Thomas E. Frantz

(57) ABSTRACT

A device for clamping a rod to stop axial and/or rotative movement between the rod and the device. The device includes pressure and clamp units, the clamp unit having a bushing fixed therein and provided with a radially resilient center section normally sized to permit movement of the rod therein. The pressure unit has an actuating piston normally held under fluid pressure in one position but movable under spring pressure toward a second position should the fluid pressure be lost or released. Such movement results in the application of pressure to the bushing to radially deflect its center section inwardly into clamping engagement with the rod to stop its movement. The center section remains clamped on the rod until sufficient fluid pressure is applied to the actuating piston to move it back to its first position thus permitting radial expansion of the center section to release the rod for movement.

20 Claims, 10 Drawing Sheets

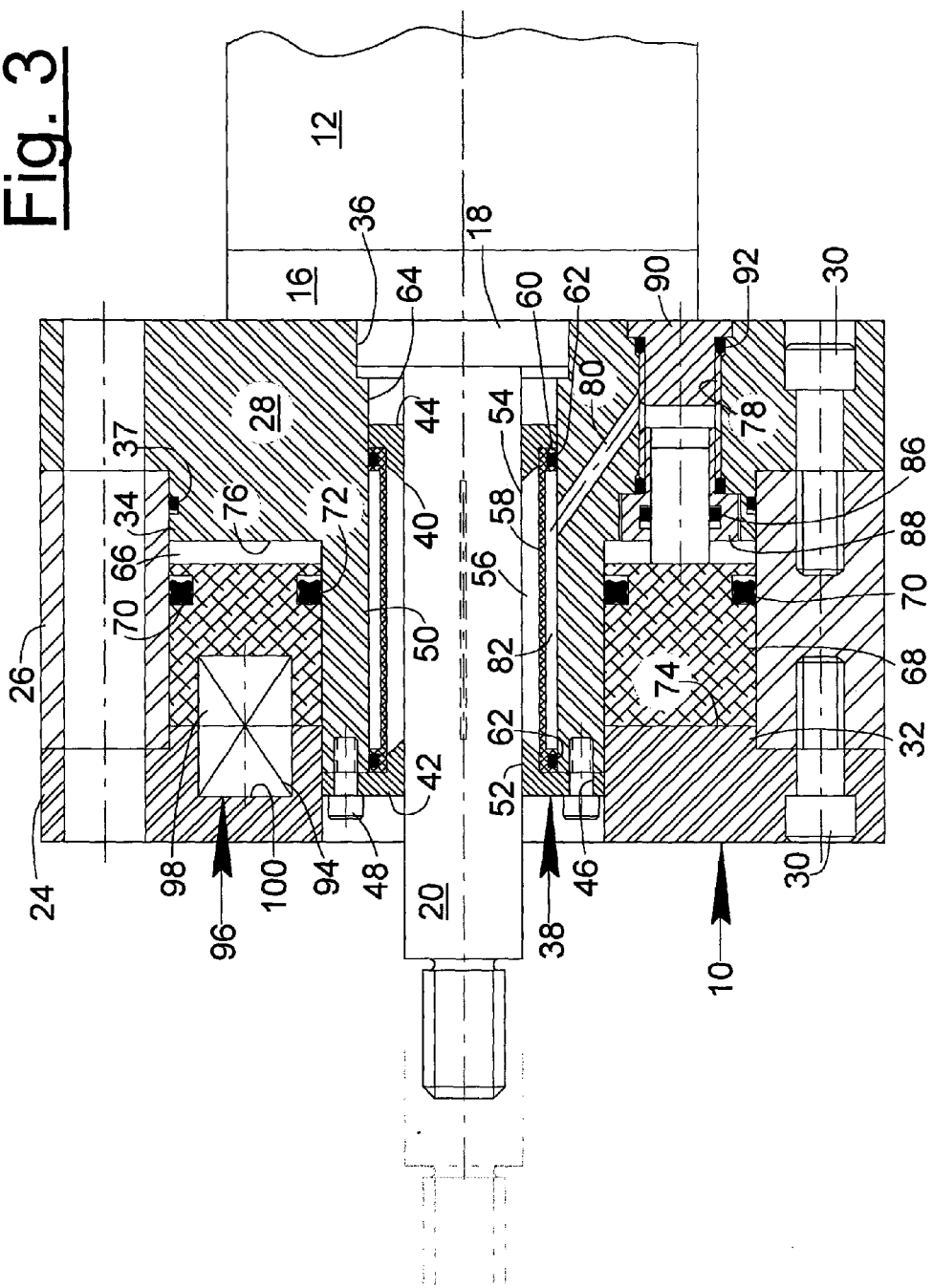

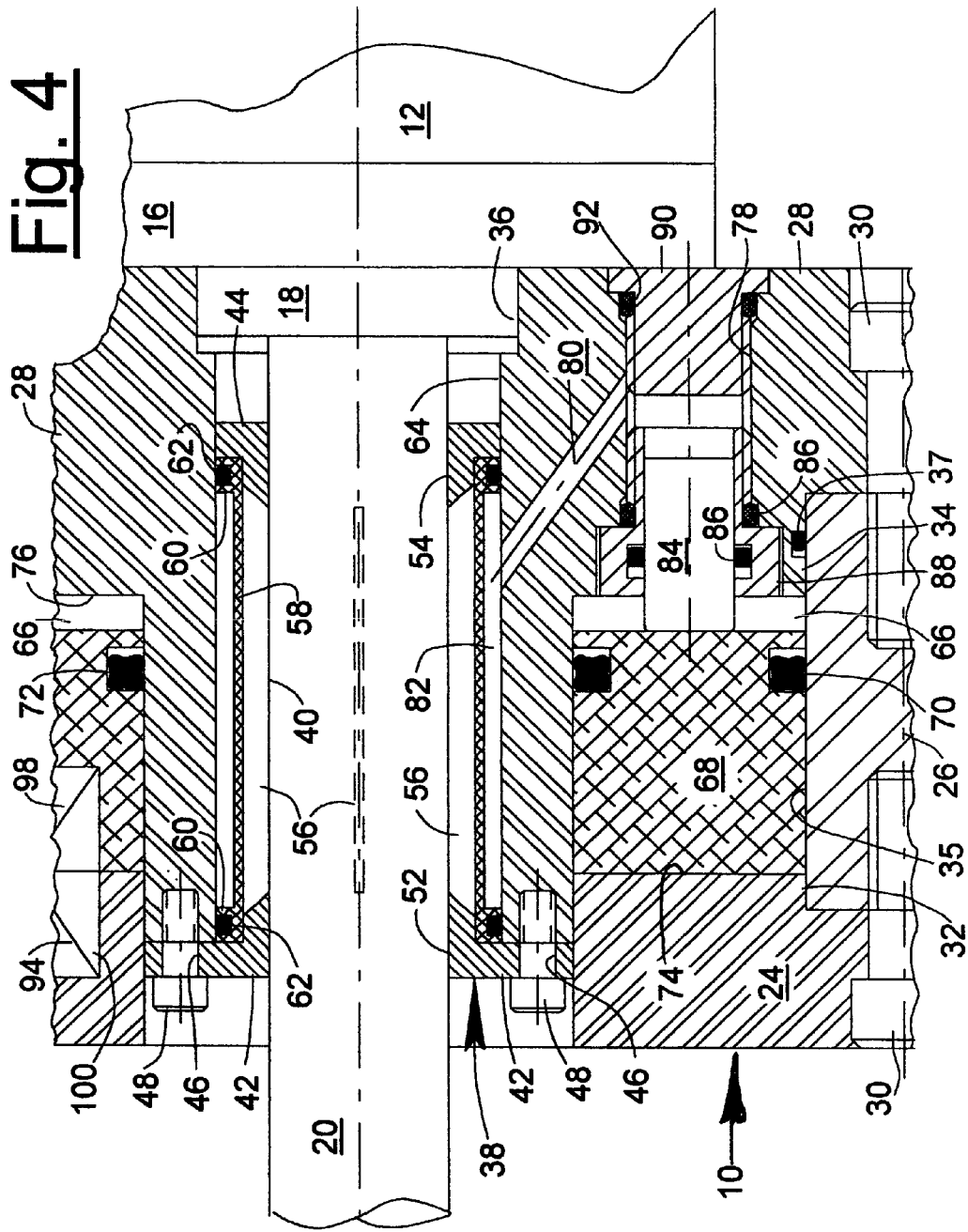

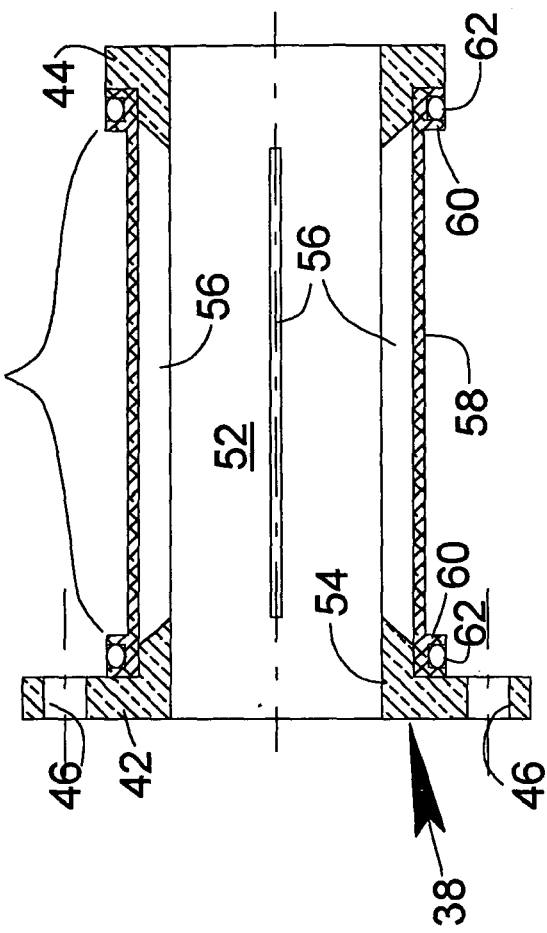
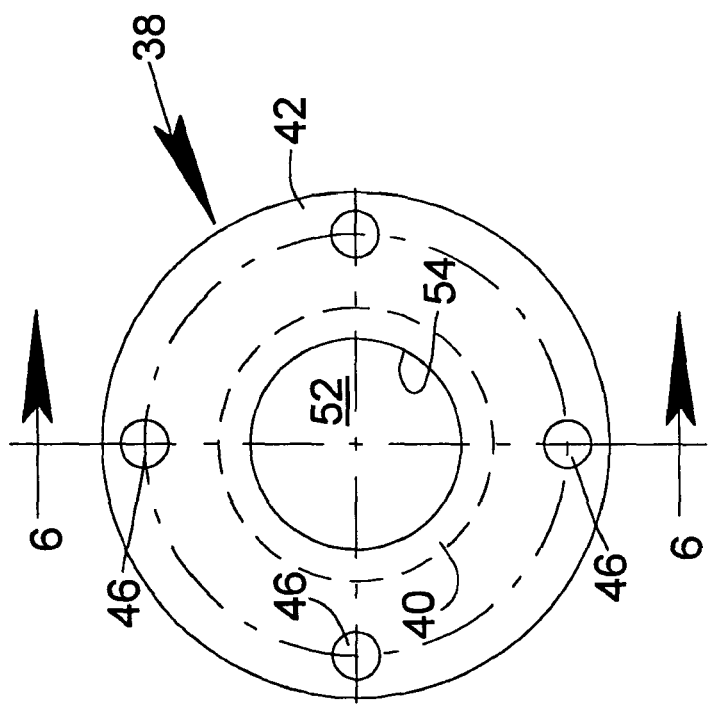

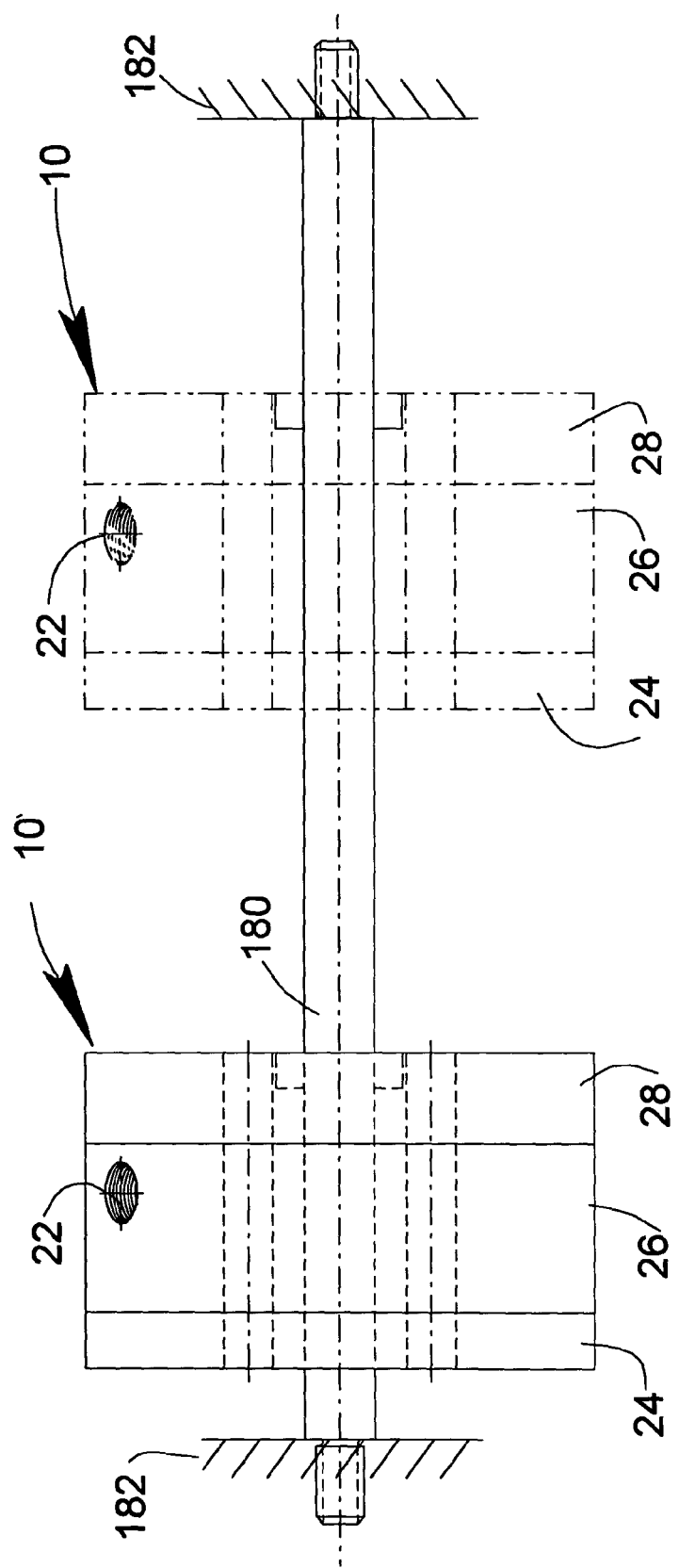

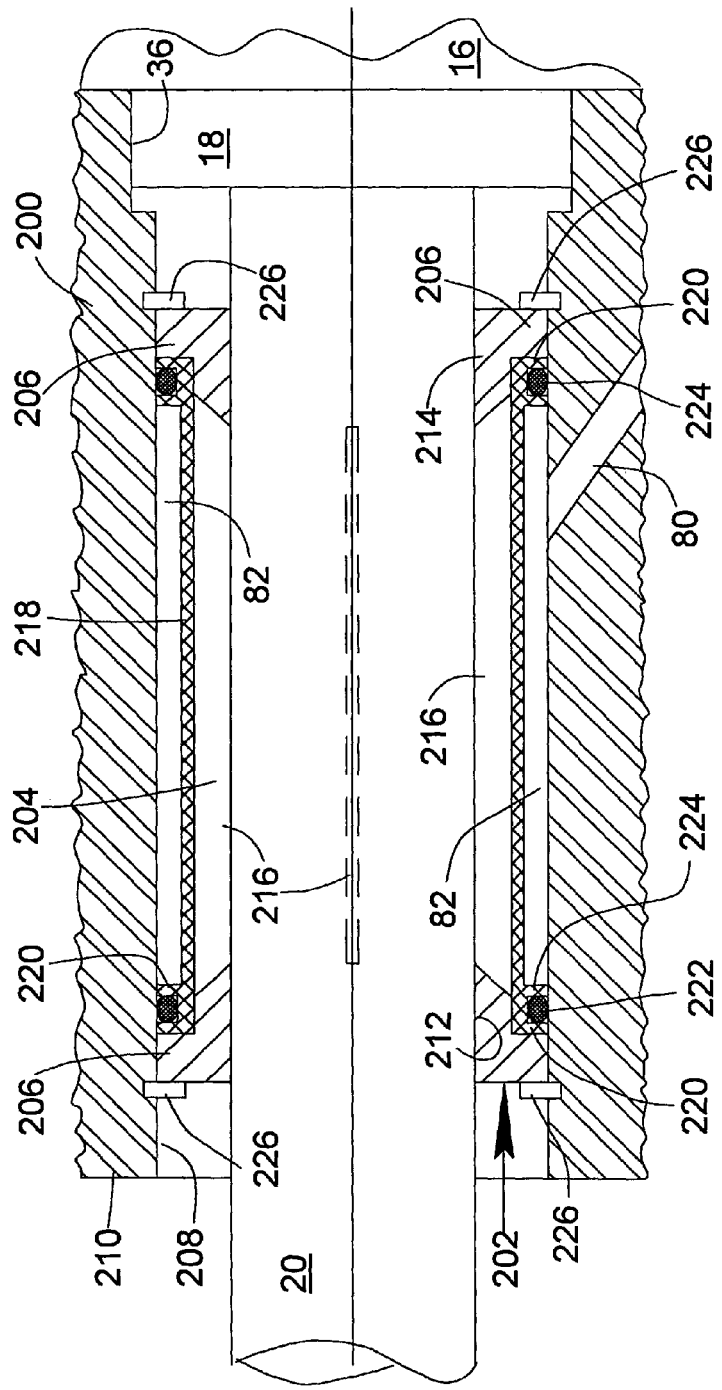

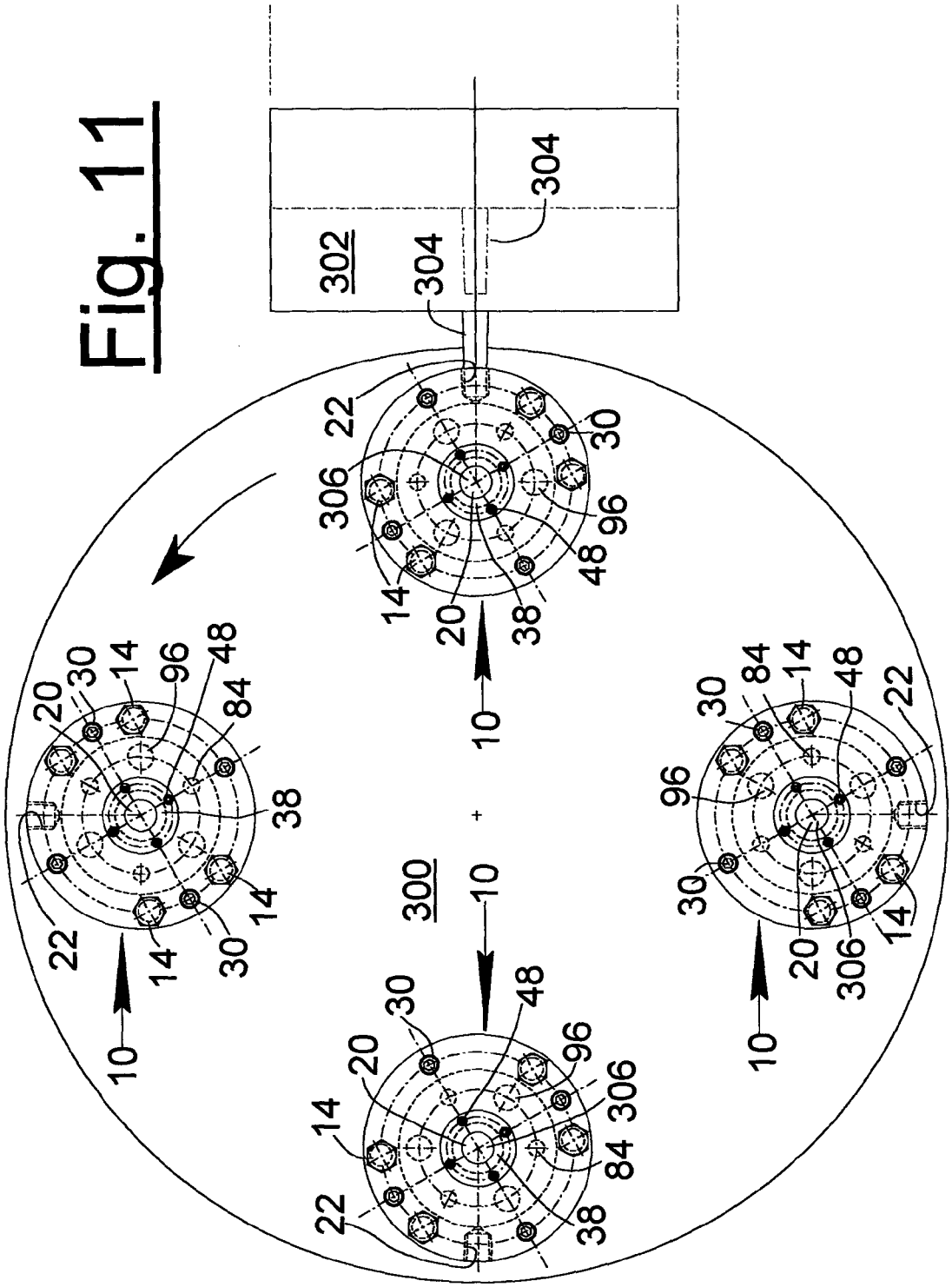

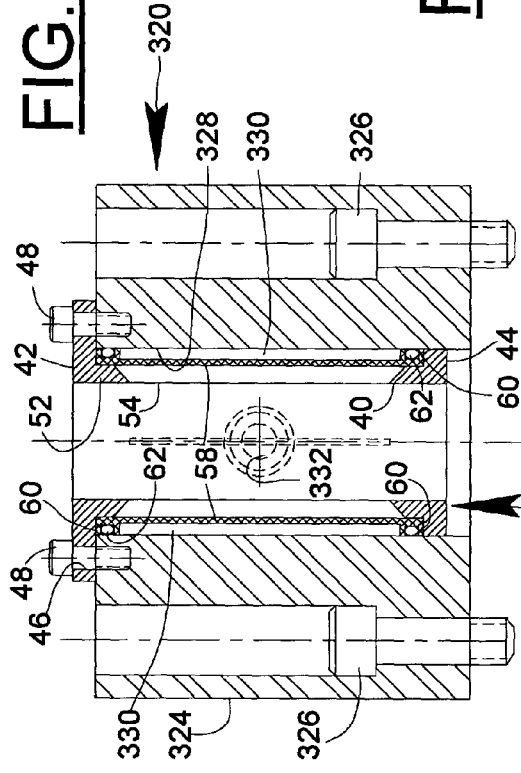
FIG. 13
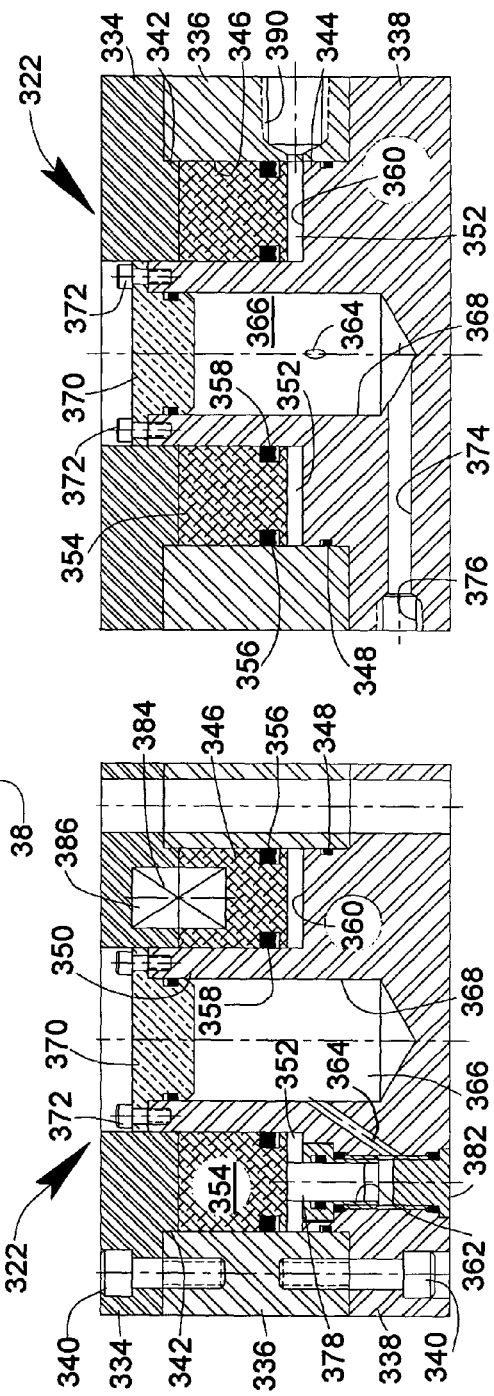
FIG. 14
FIG. 15

ROD CLAMPING DEVICE

This application claims the benefit of U.S. Provisional Patent Application No. 60/413,974 filed Sep. 27, 2002 and U.S. Provisional Application No. 60/417,452 filed Oct. 10, 2002.

FIELD OF INVENTION

The present invention relates generally to a device for stopping relative movement between a clamp unit provided by that device and a rod extending through that clamp unit.

More particularly, this invention relates to a device having a clamp unit intended for use with various products or in various applications which involve relative movement between the clamp unit and a rod and in which, for safety or security or operational reasons, it is necessary to provide a fail-safe system for stopping movement of the rod relative to the clamp unit either automatically should failure occur in the product or application or selectively as part of an operational sequence or process.

In applications where damage or injury might occur as a result of loss of system pressure or failure of a power cylinder, lift or like product due to a line break or other malfunction or accident, it is particularly important to provide a system for automatically clamping the piston rod at the point where and at the time when the failure or pressure loss occurred. Likewise, in certain applications involving movement of a device on a fixed rod, it is important not only to provide for automatic stoppage of the device should a malfunction occur, but to provide the capability of selective stoppage of the device at any desired location on the rod.

Further, where the clamp unit of a device is used to selectively clamp and release a rod at specific times or locations as a step in a process or procedure, should a malfunction occur it is important to ensure continued clamping of the rod until reaching a time or location where it normally would be released and the malfunction corrected. As will be clear from the following description and drawings, these and other requirements are fully met by the unique features and advantages provided by the present invention.

DESCRIPTION OF PRIOR ART

The prior art has long recognized the above mentioned problems and requirements, and has proposed various devices designed for use with power cylinders, lifts, and other like products in an effort to address those problems and requirements.

Examples of such devices are disclosed in numerous prior United States patents, of which the following are representative:

| | |
|---|---|
| 3,918,346 | 5,540,135 |
| 3,995,534 | 5,761,984 |
| 4,185,539 | 5,791,230 |
| 4,463,481 | 6,152,268 |
| 5,137,400 | 6,178,870 |

In most cases, these known rod clamping devices have involved the use of complex arrangements including mechanisms in which followers or sets of balls are forced up inclined surfaces or other mechanical and/or spring loaded means are used to mechanically force brake members inwardly to grip the rod. Not only have such prior devices been quite complex and expensive to manufacture and maintain, but they have been prone to erratic operation and malfunction, particularly should the sliding surfaces become galled or rough, the parts become worn or the mechanism become contaminated.

The device provided by the present invention not only has solved the aforesaid problems but it is simple in design and inexpensive to manufacture and maintain, its operation is problem free and reliable, and it is readily adaptable to a variety of uses, including but not limited to those where the movable rod may not be of circular cross section, where its operation may involve movement of the device on a fixed rod, and where clamping and release of the rod may selectively be controlled manually or automatically.

PRIMARY OBJECTIVES OF THE INVENTION

To provide In a device having a pressure operated bushing for stopping a relatively moving rod, a liquid operating system in which the pressure necessary to operate the bushing to stop movement of the rod is generated and transmitted through the liquid in that system in response to movement of spring biased piston means.

To provide a simplified yet more efficient and reliable rod clamping device capable of stopping both axial and/or rotational movement of a rod and of use with rods of non-circular cross section.

The provision of a device having a pressure unit and a clamp unit with a bushing adapted to slidably and/or rotatably receive a rod, the pressure unit including piston means normally maintained by fluid pressure in one position but movable under spring pressure toward another position in the event of loss or removal of the fluid pressure, such piston movement generating hydraulic pressure transmitted to the clamp unit to operate the bushing to clamp the rod therein against further movement relative to the clamp unit.

These and various other objectives and advantages of the invention will become more apparent from the following detailed description when taken in conjunction with the accompanying drawings.

THE DRAWINGS

FIG. 3 is an enlarged side view in section of the device of FIG. 1 as taken along the line 3—3 in FIG. 2.

FIG. 4 is a further enlargement in section of a portion of the device of FIG. 1.

FIG. 5 is an end view of the bushing of the clamp unit of the device of FIG. 1.

FIG. 6 is a sectional view of the bushing of the device of FIG. 1 as taken along the line 6—6 in FIG. 5.

FIG. 9 is a side elevational view of another embodiment of a rod clamping device according to the present invention, wherein the device is shown as being mounted on and movable along a fixed rod.

FIG. 10 is an enlarged partial side view in section of another embodiment of a rod clamping device according to the present invention.

FIG. 11 is a top plan view of a turntable on which a plurality of rod clamping devices according to the present invention are mounted.

FIG. 13 is a cross sectional view of the clamp unit of the embodiment of FIG. 12 as taken along the line 13—13 of FIG. 12.

FIG. 14 is a cross sectional view of the pressure generating unit of the device according to FIG. 12 as taken along the line 14—14 of FIG. 12.

FIG. 15 is a further cross sectional view of the pressure generating unit according to FIG. 12 as taken along the line 15—15 of FIG. 12.

DETAILED DESCRIPTION

Figure 1:
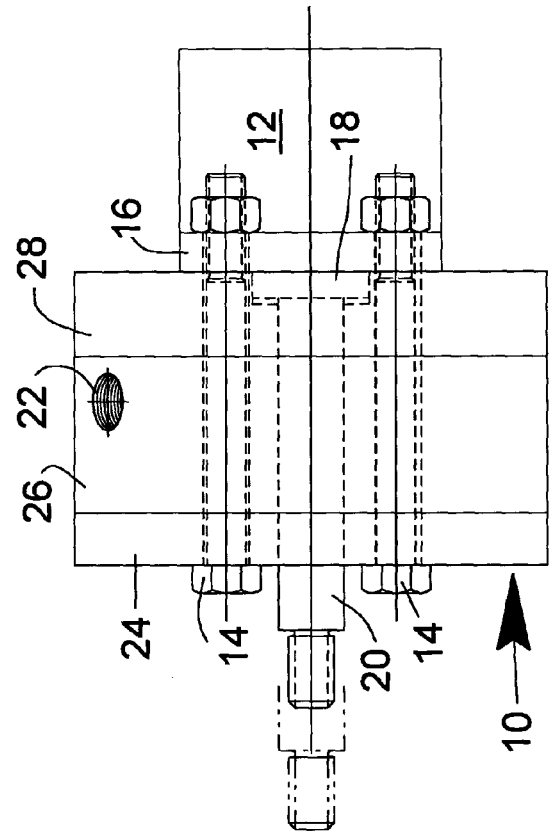
FIG. 1 is a side elevational view of one embodiment of a new and improved rod clamping device having integral pressure and clamp units and incorporating the unique aspects of the present invention, the device being attached to the front end of a common power cylinder.

Throughout this application, certain words are used for convenience only and are not to be construed as limiting. The word "fluid" is used in its broadest sense to refer to any substance that flows, including liquids, gasses (i.e. air) and viscous substances. The word "liquid" refers to any substance that flows readily and assumes the shape of its container but retains its independent volume, such as oil or water. The term "power cylinder" includes all types of power generating cylinders and similar devices involving moving rods to impart power whether operated by a fluid such as compressed air (pneumatic cylinders) or a liquid such as oil (hydraulic cylinders). Additionally, in the drawings, like elements in the same or different embodiments or views have been identified with like reference numerals throughout. Also, where a particular element may be shown numerous times in the same drawing view, it may not be identified each time it is shown in that view, and all elements shown in one view of an embodiment may not be shown in all other views of that same embodiment. Further, the term "rod" or other terms of similar import, are not to be taken as limited to an elongate article of circular cross section as other cross sectional configurations are to be included.

DETAILS OF CONSTRUCTION

Figure 2:
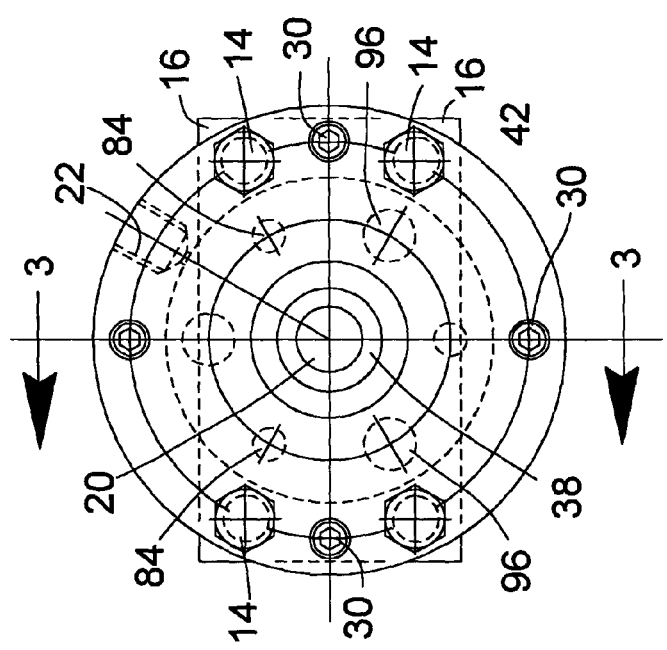
FIG. 2 is a front elevational view of the device of FIG. 1.

Continuing now with a more detailed description of the invention, reference is first made to FIGS. 1, 2 and 3, showing a preferred embodiment of a rod clamping device according to this invention. As best shown in FIG. 3, the rod clamping device 10 is mounted coaxially on a power cylinder 12 by bolts 14 running through a mounting plate 16 carried proximate the reduced diameter circular end pilot 18 of cylinder 12. Projecting outwardly through the end pilot 18 of cylinder 12 and extending coaxially through the clamping device 10 is the usual elongate piston rod 20. As will be understood by those in the art, rod 20 carries a piston (not shown) within cylinder 12, with the piston and rod 20 being movable axially relative to the cylinder 12 and device 10 in response to the injection of fluid into the cylinder 12 under pressure through a suitable port (not shown).

The rod clamping device 10 is of a relatively simple design, consisting of three coaxially aligned components, including a circular cap section 24, a generally cylindrical intermediate section 26 and a circular rearward body member 28 having a generally circular lower base, with all three sections being held together by a plurality of recessed machine screws 30. As will be noted best from FIGS. 3 and 4, cap section 24 and rearward body member 28 include short circular projections 32 and 34, respectively, which extend into and snugly engage opposite ends of the inner cylindrical periphery 35 of intermediate section 26 whereby all three body components are securely held in axial alignment. An O ring 37, carried by projection 34, sealingly engages periphery 35. Also, it will be noted that rearward body member 28 provides a relatively short rearwardly open centrally positioned bore 36 which is sized to snugly receive and secure cylinder end pilot 18 in coaxial alignment with the device 10.

Before describing the operating system provided within device 10, attention is first called to the generally cylindrical bushing 38 as best seen in FIGS. 5 and 6. This bushing comprises a part of a clamp unit and includes a generally cylindrical center section 40 terminating in outwardly projecting circular end flanges 42 and 44, flange 42 is being larger in diameter than flange 44 and including a plurality of circumferentially spaced bores 46. As best seen in FIGS. 3 and 4, flange 42 is substantially the same diameter as and overlies the outer end of centrally projecting sleeve 50 of rearward body member 28, with mounting screws 48 extending through bores 46 into threaded engagement with the outer end of sleeve 50. By virtue of this mounting arrangement, bushing 38 is fixed in position on and will not shift either axially or rotationally relative to the device 10.

Internally, bushing 38 includes a coaxially disposed bore 52 forming a straight cylindrical surface 54 which normally is slightly larger in diameter than the outside diameter of rod 20. Thus rod 20 normally is free to move within bore 52 axially and/or rotationally. However, because of the effect of the elongate slots 56 cut into the wall of center section 40, this wall is deflectable radially inwardly to reduce the diameter of bore 52 and thus cause wall 54 to frictionally clamp rod 20.

The bushing 38 preferably is fabricated of a high alloy bronze or other bearing material having good wear resistance as some slight amount of sliding contact will occur between wall 54 and rod 20 each time the device 10 is operated to stop and clamp the rod 20. To minimize any possible wear between wall 54 and rod 20 while still maintaining a good coefficient of friction therebetween, wall 54 preferably has a surface finish in the range of 32 micro inches or better, and the outer periphery of rod 20 is provided with a finish in the range of 63 micro inches or better. Also, it is important that the material constituting the center section 40 of bushing 38 have the inherent elasticity or resiliency necessary to assure radial expansion back to its normal diameter upon removal of pressure therefrom, thus releasing rod 20 for movement.

A generally cylindrical snugly fitting sleeve 58 is coaxially disposed over the center section 40 of bushing 38 and provided with outwardly extending end flanges 60 disposed in tight engagement with the oppositely facing shoulders provided by flanges 42 and 44. Sleeve 58 is formed of a synthetic resin which preferably is molded directly over slotted center section 40 of bushing 38 and, if appropriate, it is then turned down and finished to the desired outside diameter(s). The synthetic resin used for this application should be relatively rigid but somewhat elastic, dimensionally stable, and inert to any of the hydraulic oils or other liquids likely to be used in the device.

Referring again to FIGS. 3 and 4, it will be seen that seal rings 62 are carried in circular grooves formed in the outwardly extending end flanges 60 of sleeve 58, these seal rings 62 being compressed by and tightly engaging bore 64 of sleeve 50 to form a liquid tight seal therewith capable of withstanding pressures as high as 10,000 psi. Together, sleeve 58 and sleeve 50 with bore 64 comprise a clamp unit fixed by device 10 against movement relative to power cylinder 12.

The space between the outer cylindrical wall of the centrally projecting sleeve 50 of rearward body member 28 and the coaxial inner cylindrical wall 35 of the intermediate section 26 forms a circular ring like space 66 which is outwardly closed by cap section 24. Slidably disposed in this space 66 is a ring shaped actuating piston 68 having outer and inner seal rings 70 and 72 disposed in sliding sealing engagement with the coaxial surfaces of the sleeve 50 and intermediate section 26. Actuating piston 68 is movable in space 66 between an outer or first position in which its outer end is in abutment with the inner surface 74 of cap section 24 as illustrated in FIGS. 3 and 4, and a second or inner position with its inner end in abutment with the outwardly facing surface 76 of the rearward body member 28. As will be noted hereinafter, while actuating piston 68 is movable between the two positions described above, in normal operation of the device 10 the piston 68 will move only slightly toward but not actually reach its second or inner position abutting or proximate surface 76 of rearward body member 28.

Extending rearwardly from space 66 through surface 76 of rearward body member 28 are three circumferentially spaced cylinder bores 78 (see FIG. 4), each cylinder bore 78 being in communication with a cross channel bore or passage 80 which, in turn, is in communication with the space or cell 82 located between the outer surface of sleeve 58 and that portion of the periphery of bore 64 lying between the seal rings 62.

Projecting rearwardly of and movable with piston 68 are three relatively small diameter piston members 84, (hereinafter sometimes called "piston pins"), each such piston pin 84 being positioned coaxially in one of the cylinder bores 78 for reciprocal movement therein through an "O" ring or like seal 86 carried by sleeve member 88 threadedly mounted in the outer end of cylinder bore 78.

For purposes of equalizing or balancing the pressures and forces generated in the device 10 during its operation, normally at least three sets of cylinder bores 78, piston pins 84 and passages 80 should be employed in accordance with the embodiments illustrated and described herein. It will be clear to those in the art, however, that a greater number of sets of such components could and in some cases preferably should be used, depending on the size, design and performance requirements of the device and the rod to be clamped. Regardless of the number of sets used, however, they should be spaced evenly to assure proper balancing of the forces and pressures generated in the device during its operation.

A closure plug 90 is removably threaded into the rearward end of each cylinder bore 78 to seal those bores from the atmosphere. It will be noted that both the sleeve members 88 and closure plugs 90 carry "O" rings or equivalent seals 92 to ensure against any liquid bypass around these components upon operation of device 10.

The device 10 includes means for continuously biasing the actuating piston 68 rearwardly toward its second or inner position. In the embodiment shown in FIGS. 1–4 this biasing pressure is provided by three compression springs 94 disposed in three housing units 96, each such unit consisting of a first circular bore 98 extending rearwardly in piston 68 and a second circular bore 100 coaxial with bore 98 and extending forwardly in cap section 24 As will be understood, more than three sets of springs 94 and housing units 96 may be employed, but regardless of the number used, and as can best be seen from FIG. 3, the springs 94 and housing units 96 should be circumferentially evenly spaced on a circular line intermediate the sides of piston 68.

In preparing a device of the type described above for attachment to and use with a power cylinder, lifting ram, or the like, it is first necessary to connect port 22 to a pressure line through which an appropriate fluid can be injected into the space 66 between the rearwardly facing surface of actuating piston 68 and the forwardly facing surface 76 of rearward body member 28. As will be understood from the foregoing discussion, this fluid must be injected into space 66 under pressure sufficient to move actuating piston 68 in contravention to the force of the three compression springs 94 to its first or outer position abutting inner surface 74 of cap section 24. The piston, of course, will remain in this first position so long as appropriate fluid pressure is maintained in space 66.

After actuating piston 68 has been moved to its outward or first position and the closure plugs 90 removed, a substantially non-compressible hydraulic oil is then injected through open cylinder bores 78 into the connected and communicating spaces consisting of (a) the annular cell 82 of the clamp unit, (b) the cross channel bores or passages 80, and (c) the cylinder bores 78 between the inner end of pins 84 and the outer end of closure plugs 90 (hereinafter sometimes collectively called the "hydraulic system"). After these connected spaces comprising the hydraulic system have been filled with an appropriate amount and type of liquid and the open cylinder bores 78 closed by threaded plugs 90, care should be exercised to keep the actuating piston 68 from being forced by springs 94 toward its inward position in the absence of liquid pressure in space 66 and of an appropriately sized rod in bore 52. Without a rod in bore 52, the pressure generated in the hydraulic system upon inward movement of actuating piston 68 would in many cases be great enough to damage the clamp member 38 by distorting its center section 40 radially beyond its elastic limit, thereby permanently changing its internal diameter and otherwise rendering it useless.

Accordingly, in disconnecting the pressure line from port 22 preparatory to moving or readying the device 10 for shipment or assembly with a power cylinder or other machine, care needs to be exercised at all times to ensure that the actuating piston 68 is restrained against undesired inward movement as by placement of an appropriate "dummy" rod in the bore 52 of clamp bushing 38 prior to any such pressure release, such rod being of the same size and cross sectional configuration as the rod 20 of the cylinder 12 or other article to be used later with the device 10, or providing a mechanical arrangement for holding the actuating piston 68 in its outward position, as by providing at least one bore axially through cap section 24 sized to permit passage of a bolt adapted to threadedly engage and anchor piston 68 against movement in the absence of liquid pressure in space 66.

The pressure line may then be disconnected from port 22, and the device 10 moved or shipped free of any need for continuous connection to a pressure line.

From the preceding discussion, it will be clear that upon disconnection of the pressure line from port 22 and the release of fluid pressure from space 66, actuating piston 68 will move toward its inner or second position in response to the biasing action of springs 94. Such movement will cause piston pins 84 to move rearwardly in cylinder bores 78 and generate on the liquid in the hydraulic system pressure sufficient to radially compress the center section 40 of clamp member 38 tightly around rod 20.

When the device 10 is intended for use with a power cylinder or like product involving a movable rod 20, it is highly desirable that the same pressure source be used for both the device 10 and the cylinder or product on which the device 10 is mounted. By utilizing the same pressure source for both the device 10 and the product to be protected, any pressure loss causing a malfunction in the product will simultaneously cause loss of pressure in space 66 of the device 10, thus permitting actuating piston 68 to move toward its second or inner position under the biasing action of springs 94 to promptly clamp rod 20 against further movement, whether axial or rotative, at the point where the pressure was lost. Upon the restoration of pressure to the product and to space 66 of device 10, actuating piston 68 will be forced forwardly to its outer or first position, thus releasing rod 20 for movement in a normal manner.

It will be understood by those in the art that, in addition to its significant value as an automatically functioning safety device in preventing damage and injury in case of accidental loss of pressure in a power cylinder, lift, or the like, the present device may also be adapted to operate under manual control as a clamp for selectively stopping and holding the piston rod of a power cylinder or like product at a desired point without the necessity of maintaining constant pressure in the cylinder. For such use, it is merely necessary to run the pressure line feeding the cylinder and clamping device through a manual or machine controlled valve unit which can be operated to cut off and reestablish pressure and thereby stop and start the piston rod at any desired point.

Figure 7:
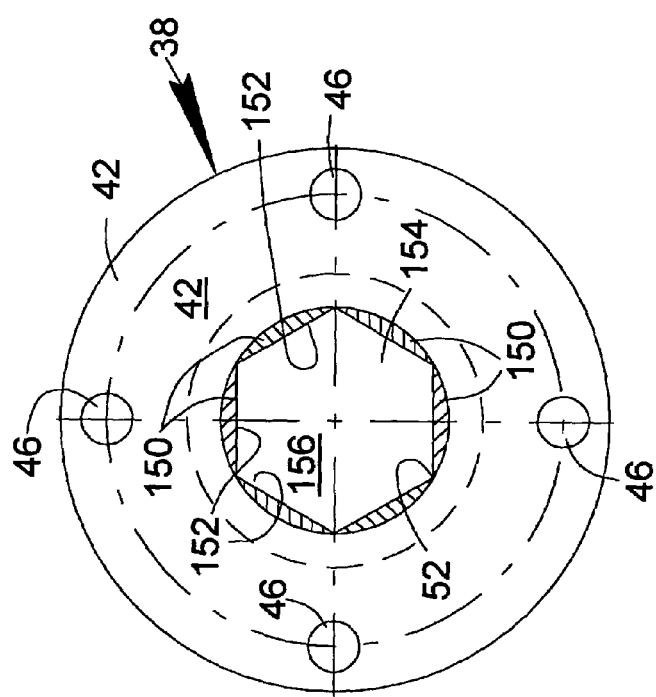
FIG. 7 is a cross sectional view of another embodiment of a bushing similar to the bushing of the embodiment of FIG. 1 except that it is adapted for use with a rod having an octagonal cross section.

FIG. 7 shows an end view of the bushing 38 of the embodiment of FIG. 1, containing in its internal bore 52 six inserts 150 having curved outer surfaces and flat inner surfaces 152 which are positioned to collectively form a hexagonally shaped central bore 154 coaxial with bore 52 and sized to slidingly receive a hexagonally shaped rod 156. In operation, a device 10 including a bushing containing the inserts shown in FIG. 7 would operate the same as the FIG. 1 device described in detail hereabove as the inserts 150 in the circular bore 52 of bushing 38 would simply move inwardly with the center section 40 to clamp the rod 156 in case of loss of pressure to the device.

Figure 8:
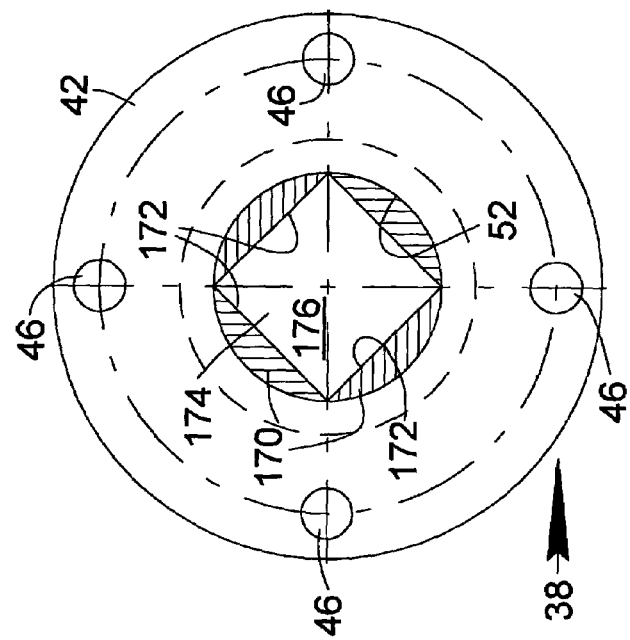
FIG. 8 is a cross sectional view of another embodiment of a bushing similar to the bushing of the embodiment of FIG. 1, except that it is adapted for use with a rod having a square cross section.

The embodiment of FIG. 8 is the same as that of FIG. 7 except FIG. 8 shows the use in bore 52 of bushing 38 of four inserts 170 having flat inner surfaces 172 which are positioned to collectively form a square shaped bore 174 coaxial with bore 52 and sized to slidingly receive a square rod 176. In operation, a device 10 including a bushing with the inserts as shown in FIG. 8 would operate the same as the FIG. 1 device described in detail hereabove as the inserts 170 in the circular bore 52 would simply move inwardly with the center section 40 to clamp the rod 176 in case of loss of pressure to the device.

From the above discussion of the bushing embodiments of FIGS. 7 and 8, it will be obvious to those in the art that a device according to the present invention is capable of successful use with rods of practically any cross sectional configuration simply by providing inserts for the internal bore 52 of the bushing 38 which collectively form a coaxial bore of a size and configuration equal to those of the non-circular rod.

Referring now to FIG. 9, the device 10 is shown therein as being slidably mounted on a rod 180 which is supported on fixed entities 182. While supplemental bearings could be added in the bore 64 of sleeve 50 of rear section 28 to support the device 10 for sliding movement on rod 180, in this embodiment such sliding movement is provided by the bushing 38 of the clamp unit since it preferably is fabricated of a bearing material. Thus, in addition to providing for a clamping action on rod 180 in the manner described above with reference to the embodiment of FIG. 1, the bushing 38 also acts as a bearing slidably supporting the device 10 for axial movement along that rod.

As illustrated in FIG. 9, the device 10 would not be movable on rod 180 as port 22 is open and there would be no pressure holding piston 68 in its outer or first position freeing bushing 38 for movement on rod 180. Accordingly, to effect movement of the device 10 on rod 180, it would be necessary to connect port 22 to a source of fluid pressure sufficient to force actuating piston 68 to its outer or first position, thus relieving pressure on the bushing 38 to free rod 180. As indicated by the dotted line figure, the device 10 would then be free for movement along rod 180 either manually or with some mechanical or other motive means while being selectively stopped at desired locations using an appropriate fluid valving system.

FIG. 10 shows yet another embodiment which is similar in construction and operation to the embodiment of FIG. 1, except for the mounting of the bushing 202 forming a part of the clamp unit. In the FIG. 1 embodiment, the bushing 38 is positively fixed to the outer end of sleeve 50 by screws 48 and is adapted to stop any relative movement of rod 20, whether axial or rotative. Thus, even if the rod 20 should be under substantial axial and/or rotative pressure, the FIG. 1 embodiment is capable of stopping all movement thereof. On the other hand, in the FIG. 10 embodiment, the bushing 202 is capable of stopping axial movement of rod 20, but it would not be expected to resist substantial rotative pressure. Thus, the FIG. 10 embodiment normally would be used where only axial movement of rod 20 might be expected.

Referring in greater detail to FIG. 10, the device shown therein is substantially the same as the FIG. 1 embodiment except for the bushing 202, the circular rearward body member 200 of the body of the device, and the mounting of the bushing as part of the clamp unit. With these exceptions, the descriptive names and numeral identification of other components depicted in FIG. 10 are the same as those in the FIG. 1 embodiment.

As will be noted from FIG. 10, the circular rearward body member 200 includes a relatively shallow bore or recess 36 sized to receive the end pilot 18 of the power cylinder (not shown) carried on mounting plate 16. Projecting outwardly through the end pilot 18 and extending coaxially through the bushing 202 is the usual axially movable elongate piston rod 20.

The bushing 202 is generally cylindrical in configuration, and includes a center section 204 terminating in outwardly projecting circular end flanges 206 of equal size and of a diameter slightly less than that of central bore 208 of outwardly projecting sleeve 210 of rearward body member 200.

As with the bushing of the embodiment of FIG. 1, internally bushing 202 includes a coaxially disposed bore 212 forming a straight cylindrical surface 214 which normally is slightly larger in diameter than the outside diameter of rod 20. Thus the rod 20 normally is free to move within bore 212. However, because of the effect of the elongate slots 216 cut into the wall of center section 204, this wall is deflectable radially inwardly to reduce the diameter of bore 212 and thus cause cylindrical surface 214 to frictionally clamp rod 20.

To minimize any possible wear, the bushing 202 preferably is fabricated of a bearing material having good wearing characteristics and resiliency, with the cylindrical surface 214 and rod 20 being polished or otherwise processed to provide the smooth surface finishes described hereabove with respect to the embodiment of FIG. 1.

As with the earlier described bushing, a generally cylindrical snugly fitting sleeve 218, formed insitu of a tough resilient synthetic resin, is coaxially disposed on the center section 204 of bushing 202 and provided with outwardly extending end flanges 220 disposed in tight engagement with the oppositely facing shoulders provided by end flanges 206. Seal rings 222 are carried in circular grooves 224 formed in the outwardly extending end flanges 220 of sleeve 218, these seal rings 222 being compressed by and tightly engaging bore surface 214 to form liquid tight seals therewith.

In this embodiment, the axial position of bushing 202 in bore 208 is determined and maintained by circular snap rings 226 mounted in circular grooves formed in the circular wall of bore 208. Without snap rings 226 or some equivalent anchoring means, the bushing 202 would tend to shift in bore 208 should rod 20 be subjected to a substantial axial load while clamped by the bushing 202. Resistance to rotation would be relatively low unless the clamp bushing 202 should be slotted at one end to engage a pin or key provided in the wall of bore 208.

Aside from the matter of possible reduced resistance to axial rotation, the embodiment of FIG. 10 would be essentially the same in application and operation as in the earlier described embodiment of FIG. 1.

Attention is now called to FIG. 11, wherein a plurality of rod clamp devices 10 according to the embodiment of FIG. 1 are shown as being secured on an index table 300 for use in holding work pieces 306 as they are indexed by table 300 between work positions. In this embodiment, the devices 10 are attached by bolts 14 to the index table 300 rather than to a power cylinder or like product. In all other respects, however, the devices 10 are constructed and operated in the same manner as those described with reference to FIG. 1.

In this embodiment, the clamp devices 10 are not connected continuously to a pressure source but rather each device is connected to a source of pressure only temporarily and only upon being indexed to the right hand position proximate reciprocal pressure injection assembly 302. This assembly 302 is reciprocal between the two positions indicated by solid/dotted lines, and includes a transfer nozzle 304 which is connected through appropriate valve means to a pressure source (not shown) and which will form a fluid tight seal with port 22 of device 10 upon being pressed into port 22 in accordance with the solid line showing of assembly 302. While so sealed to port 22, the transfer nozzle will permit the passage of fluid under pressure into the device 10 to actuate the hydraulic system previously described to effect the release of the work piece 306 then present in the bushing 38 of the clamp unit. Pressure, of course, should be maintained in the hydraulic system until such time as a new work piece 306 is inserted in clamp bushing 38, such insertion automatically triggering assembly 302 to withdraw nozzle 304 from port 22 and return to its retracted dotted line position. Thereafter, index table 300 may be actuated to move a quarter of a turn to position another device 10 for replacement of the work piece 306 carried therein.

Should any of the embodiments discussed hereinabove prove to be too heavy or too large or otherwise not suitable for a particular application, a clamping device according to this invention may be provided as separate functional units, including a relatively small clamp unit 320 and a separate pressure unit 322 as described herebelow.

The clamp unit 320 includes a generally elliptically shaped body portion 324 which is adapted to be mounted by recessed screws 326 on a power cylinder or other mechanism (not shown) having a movable rod (not shown) requiring emergency or selective clamping. As will be seen best from FIG. 13, clamp unit 320 includes a centrally disposed cylindrical aperture 328 in which bushing 38 is mounted. As described previously, bushing 38 includes a generally cylindrical center section 40 terminating in outwardly projecting circular end flanges 42 and 44, flange 42 being larger in diameter than flange 44 and including a plurality of circumferentially spaced bores 46. Flange 42 overlies the outer end of body member 324, with mounting screws 48 extending through bores 46 into threaded engagement with body member 324. By virtue of this mounting arrangement, bushing 38 is fixed in position in and will not shift either axially or rotationally relative to the clamp unit 320 and the power cylinder or machine on which the clamp unit 320 is mounted.

Internally, bushing 38 includes a coaxially disposed bore 52 forming a straight cylindrical surface 54 which normally is slightly larger in diameter than the outside diameter of the rod (not shown) to be used with the clamp unit 320. Thus the rod normally will be free to move within bore 52 axially and/or rotationally. However, because of the effect of the elongate slots 56 cut into the wall of center section 40, this wall is deflectable radially inwardly to reduce the diameter of bore 52 and thus cause wall 54 to frictionally clamp rod 20.

Bushing 38 preferably is fabricated of a bearing material having good wearing characteristics and resiliency, with the cylindrical surface 54 and outside surface of the rod to be used therewith being polished or otherwise processed to provide the smooth surface finishes described hereabove with respect to the embodiment of FIG. 1.

As with the earlier described bushings, a generally cylindrical snugly fitting sleeve 58, formed insitu of a tough resilient synthetic resin, is coaxially disposed on the center section 40 of bushing 38 and provided with outwardly extending end flanges 60 disposed in tight engagement with the oppositely facing shoulders provided by end flanges 42 and 44. Seal rings 62 are carried in circular grooves formed in the outwardly extending end flanges 60 of sleeve 58, these seal rings 62 being compressed by and tightly engaging bore 328 to form liquid tight seals therewith.

The clamp unit 320 provides a cylindrical space or cell 330 between the outer surface of sleeve 58 and that portion of the periphery of aperture 328 lying between the seal rings 62. Communicating with and extending transversely from this cell 330 through the side wall of body portion 324 is an inlet port 332 for a purpose to be described hereinafter.

Figure 12:
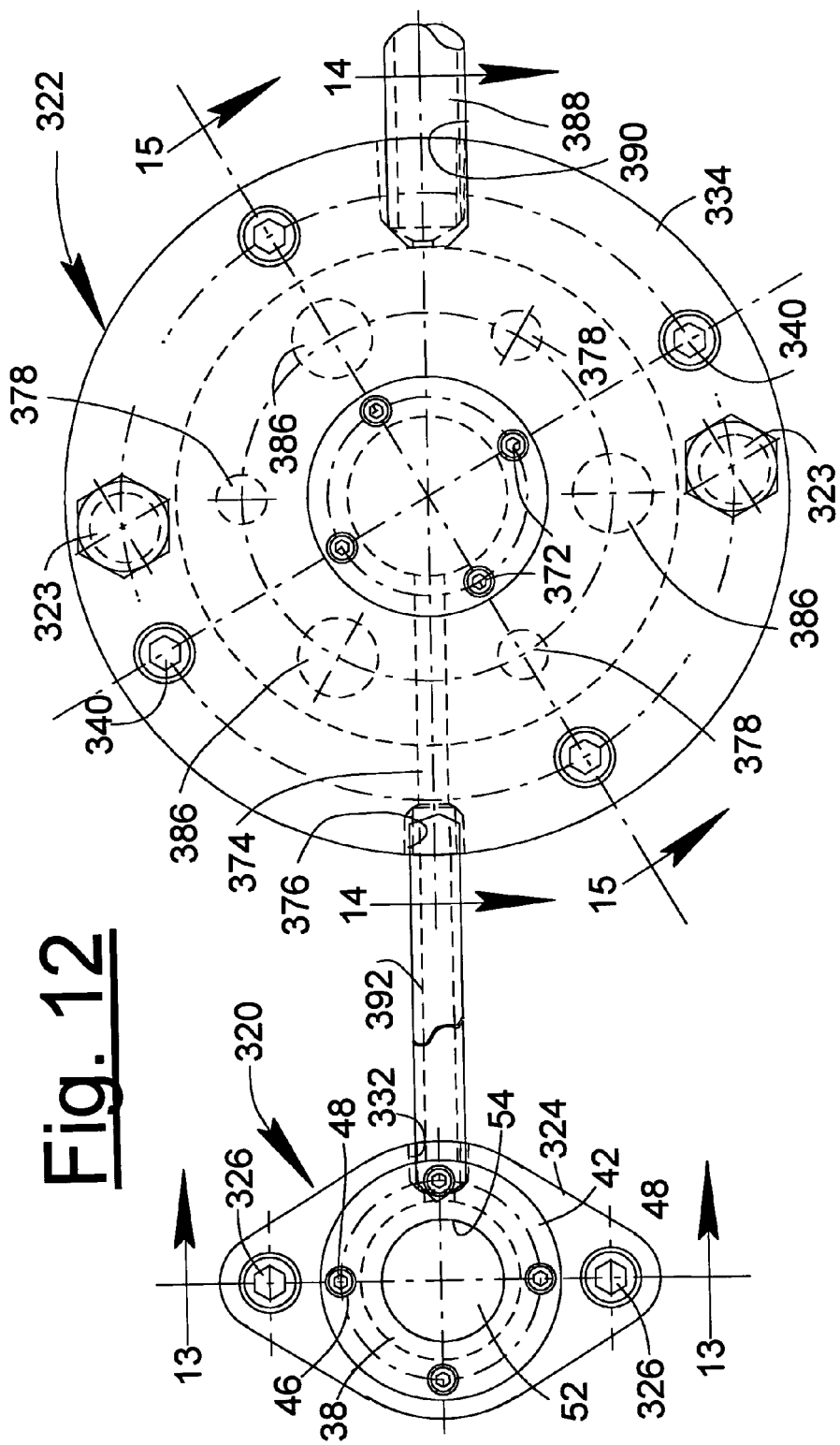
FIG. 12 is a top plan view of the pressure and clamp units of yet another embodiment of a rod clamping device according to the present invention.

The right hand view in FIG. 12 and FIGS. 14 and 15, show a pressure unit 322 which normally is disposed remote from the clamp unit 320 and the power cylinder or other mechanism (not shown) on which the clamp unit 320 is mounted. This pressure unit 322 consists of three coaxially aligned components, including a circular cap section 334, a generally cylindrical intermediate section 336 and a circular rearward body member 338, with all three sections being secured together by a plurality of recessed machine screws 340. As will be seen best in FIG. 14, cap section 334 and rearward body member 338 include short circular projections 342 and 344, respectively, which extend into and snugly engage opposite ends of the inner cylindrical periphery 346 of intermediate section 336 whereby all three body components are securely held in axial alignment. An O ring 348, carried by projection 344, sealingly engages periphery 346.

The space between the outer cylindrical wall of the centrally projecting sleeve 350 of rearward body member 338 and the coaxial inner cylindrical wall 346 of the intermediate section 336 forms a circular ring like space 352 which is outwardly closed by cap section 334 and inwardly by rearward body member 338. Slidably disposed in this space 352 is a ring shaped actuating piston 354 having outer and inner seal rings 356 and 358 disposed in sliding sealing engagement with the coaxial surfaces of the sleeve 350 and intermediate body section 336. Actuating piston 354 is movable in space 352 between an outer or first position in which its outer end is in abutment with the inner surface of projection 342 of cap section 334 as illustrated in FIGS. 14 and 15, and a second or inner position with its inner end in abutment with the outwardly facing surface 360 of the rearward body member 338. As noted in connection with earlier embodiments of this invention, while actuating piston 354 is movable between the two positions described immediately above, in normal operation of the pressure unit 322, actuating piston 354 will move only slightly toward but not actually reach its second or inner position abutting or proximate surface 360.

Extending rearwardly from space 352 through surface 360 of rearward body member 338 are three circumferentially spaced cylinder bores 362 (see FIG. 15), each cylinder bore 362 being in communication with a cross channel bore or passage 364 which, in turn, is in communication with the space 366 formed by rearwardly extending bore 368 in sleeve 350. Bore 368 does not extend through the bottom of rearward body member 338, and the top of bore 368 is closed and sealed by a closure 370 secured by machine screws 372. Space 366 is thus sealed from the ambient atmosphere except through an outlet bore or passage 374 communicating at its inner end with space 366 and at its outer end with a pressure port 376.

Movable with piston 354 are three relatively small diameter cylindrical piston members 378 (hereinafter sometimes called "piston pins"), each such piston pin 378 being positioned coaxially in one of the cylinder bores 362 for reciprocal movement therein through an "O" ring or like seal carried by sleeve member 380 threadedly mounted in the outer end of cylinder bore 362. A closure plug 382 is removably threaded into the rearward end of each cylinder bore 362 to seal those bores from the atmosphere. It will be noted that both the sleeve members 380 and closure plugs 382 carry "O" rings or equivalent seals to ensure against any undesired liquid bypass around these components.

Means for continuously biasing the actuating piston 354 rearwardly toward its second or inner position is provided by three compression springs 384 which are disposed in three circumferentially evenly spaced housing units 386 consisting of coaxial circular bores extending rearwardly in piston 354 and forwardly in cap section 334.

As will be understood from the foregoing discussion of this and earlier embodiments, fluid must be injected through pressure line 388 and port 390 into space 352 under pressure sufficient to move actuating piston 354 in contravention to the force of the three compression springs 384 to its first or outer position abutting inner surface of cap section 334. The actuating piston, of course, will remain in this first position so long as appropriate fluid pressure is maintained in space 352.

The hydraulic system in this embodiment is completed by connecting inlet port 332 of clamp unit 320 to pressure port 376 of pressure unit 322 using a high pressure line 392 of a length appropriate to permit placement of the pressure unit 322 at the desired distance from the power cylinder or other machine on which the clamp unit 320 is to be mounted. It will be understood, of course, that should the clamp unit 320 be mounted on a power cylinder or other mechanism (not shown) which is movable relative to the pressure unit 322, the high pressure line should be of a flexible nature. After such connection, and after actuating piston 354 has been moved to its outward or first position and the closure plugs 380 removed, a non-compressible hydraulic oil is then injected through open cylinder bores 362 into the connected and communicating spaces consisting of (a) the annular cell 330 of the clamp unit 320, (b) the cross channel bores or passages 364, (c) the cylindrical bores 362 between the inner end of piston pins 378 and the outer end of closure plugs 382 and (d) the high pressure line 388 between pressure ports 376 and 332 (sometimes collectively called the "hydraulic system"). After these connected spaces, comprising the hydraulic system, have been filled with an appropriate amount of liquid and the open cylinder bores 362 closed by threaded plugs 382, a short "dummy" piece of rod material should then be placed in bushing 38 to ready the device for subsequent movement or shipment.

As with the earlier embodiments, when the clamp unit 320 is intended for use with a power cylinder or like machine involving a movable rod 20, it is highly desirable that the same fluid pressure source be used for both the power unit 322 and the cylinder or machine on which the clamp unit 320 is mounted. By utilizing the same pressure source for both, any pressure loss causing a malfunction in the cylinder or machine will simultaneously cause loss of pressure in space 352 of the pressure unit 322, thus permitting actuating piston 354 to move toward its second or inner position under the biasing action of springs 384 to promptly clamp the rod against further movement, whether axial or rotative, at the point where the pressure was lost. Upon restoration of pressure, actuating piston 354 will be forced forwardly to its outer or first position, thus releasing the rod for movement in a normal manner.

It should be noted at this point that a rod clamping device of the type covered by the embodiment of FIGS. 12–15 is not limited to use of a clamp unit 320 which is separate from and attached as an add-on to the power cylinder or other machine with which it is to be used. Rather the clamp unit 320 easily may be adapted for inclusion as an original and permanent component of the cylinder head or machine section through which the movable rod projects, with the pressure unit 322 of the device then being mounted at a remote location and connected to the clamp unit 320 through a suitable high pressure line 392.

EXAMPLE

Changes

Those skilled in the art will recognize that a device according to the present invention can be varied significantly to accommodate various sizes of rods to be clamped and axial and/or rotative forces to be resisted. Clamp Bushings of the type included in the embodiments discussed above are commercially available in various diameters and lengths to accommodate different rod sizes and other design requirements, and the amount of clamp pressure on a rod can be varied quite readily by changes in the hydraulic system as determined in accordance with normal hydraulic force calculations. The following example will illustrate calculations for a device according to FIG. 1 intended for use with a power cylinder (a) having an ⅝ inch diameter piston rod in which an axial force of 500–800 pounds would require support in the event of cylinder failure and (b) requiring a minimum of 100 psi for operation.

In this example, the port 22 of device 10 would be connected to the same source of pressurized fluid, in this case compressed air at 100 psi, as the power cylinder 12. Thus, any interruption in the supply of compressed air will simultaneously be reflected in both the cylinder 12 and device 10, causing the cylinder to lose power and the device to immediately clamp the piston rod against any undesired movement from the point where power was lost.

Prior to any such interruption, the ring shaped space 66 in device 10 will be maintained at 100 psi, which pressure will generate a total of about 590 pounds of force on the inner or rearward end of actuating piston 68, which has a total area of 5.9 square inches. As this force must be sufficient to move actuating piston to its outer or first position in contravention to the combined pressure of the three compression coil springs 94, each such spring should be selected through use of well known spring design criteria to generate no more than about 190–195 pounds of recoil against piston 68 Thus, so long as the actuating piston 68 is held by the compressed air in its outer position against the pressure of springs 94, the center section 40 of clamp bushing 38 will be open and the piston rod free to move therethrough.

In the event of an interruption in the supply of compressed air, the cylinder will cease to operate and the pressure in space 66 will drop, thus permitting movement of actuating piston 68 in space 66 toward its inner or second position under approximately 590 pounds of pressure from springs 94. Simultaneously, piston pins 84 will be pressed inwardly or rearwardly in bores 78 against the hydraulic fluid contained in the heretofore described hydraulic system. In the present embodiment, each pin has a diameter of 0.3125" thus providing an end surface area of 0.076 square inches, or a total combined area of 0.229 square inches for all three pins. The pressure (590 pounds) generated by springs 94 and exerted on actuating piston 68 will be transferred to piston pins 84, resulting in the generation of approximately 2576 psi (590 pounds/0.229 square inches) on the liquid contained within the hydraulic system. Such pressure surrounding the center section 40 of clamp bushing 38 will press the center section 40 radially inwardly to clamp rod 20 against movement until such time as 100 psi air pressure is again present in space 66.

From the above discussion of one example of a device with certain capabilities, it will be obvious to those skilled in the art that numerous variations may be made to adapt the invention to different circumstances and uses. As one simple example, by increasing the air pressure applied to port 22 the force of compression springs 94 can be raised, and such raise will increase the force applied through the hydraulic system to the clamp bushing 38. These forces and the components which affect the forces can be manipulated over a wide range to suit the many applications of the invention.

SUMMARY

From the foregoing, it will be apparent that the present invention brings to the art a new and greatly improved concept and device which, by virtue of its exclusive use of a spring activated hydraulic system to apply pressure through a hydraulic liquid on a cylindrical bushing (a) to stop movement of a rod virtually instantly upon loss of pressure in the system driving that rod and (b) to hold that rod against movement so long as pressure is not injected into that system, is uniquely adapted to provide a simple yet reliable fail safe system which is inexpensive to manufacture, maintain and use.

I claim:

1. A device for controlling movement between that device and a rod operatively engaged with that device, comprising
   a body member,
   a bushing carried by said body member and provided with
      a central bore defining an inner surface through which the rod is coaxially and slidingly received, and
      a center section radially deflective between
         an inner position engaging and clamping the rod to stop movement between the rod and the body member and
         an outer position releasing the rod to permit movement between the rod and said body member,
   a hydraulic system for moving said center section between its said outer and inner positions comprising
      a liquid receiving expandable cell contiguous with said center section,
      passage means extending from said cell,
      at least one cylinder bore communicating with said passage means,
      a piston pin movable in said cylinder bore, and
      a substantially incompressible hydraulic liquid filling said hydraulic system,
   said piston pin being movable in said cylinder bore
      toward an inner position generating and transmitting pressure through said hydraulic liquid to expand said cell to move said center section to its inner position to clamp the rod, and
      to an outer position relieving pressure from and permitting contraction of said cell and movement of said center section to its outer position to release the rod,
   an actuating piston engaging said piston pin and moving therewith between inner and outer positions,
   means biasing said actuating piston and said piston pin toward their inner position, and
   means for applying pressure against said actuating piston to move said actuating piston and said piston pin in contravention to said biasing means to their outward position to release the rod,
   said biasing means moving said actuating piston and said piston pin toward their inner position to move said center section to its inner position to clamp the rod and stop movement between the rod and the device in the event of a significant reduction of pressure against said actuating piston.

2. A device according to claim 1 characterized by
   said hydraulic system comprising
      more than one cylinder bore,
      a piston pin movable in each of said cylinder bores,
      passage means between said cell and said cylinder bores, and
   said actuating piston being engaged and movable simultaneously with each of said piston pins.

3. A device according to claim 2 characterized by
   said hydraulic system having three cylinder bores
      a piston pin movable in each of said three cylinder bores,
      passage means between said cell and said three cylinder bores, and said actuating piston being engaged with and movable simultaneously with said three piston pins.

4. A device according to claim 3 characterized by
said body member having
  a generally circular base portion,
  a circular sleeve extending outwardly from said base portion and provided with a centrally disposed cylindrical aperture extending through the device,
said bushing being axially aligned with and mounted within said centrally disposed cylindrical aperture,
said three cylinder bores being circumferentially spaced in said base portion radially around said sleeve,
said actuating piston being
  generally ring shaped,
  provided with an inner periphery sized to slide over the outer periphery of said sleeve,
  provided with an inner end
    engaged with said piston pins and
    against which pressure is applied by said pressure means for moving said actuating piston and said piston pins to their outward position to release the rod.

5. A device according to claim 4 characterized by
a liquid impervious radially resilient sleeve covering the outer periphery of said center section,
the outer surface of said resilient sleeve being spaced from and forming with the inner surface of said aperture an annular space,
seal rings positioned proximate the ends of said bushing and sealingly engaging the inner surface of said aperture,
said annular space between the seal rings comprising said liquid receiving expandable cell.

6. A device according to claim 5 characterized by
said center section being
  formed of a wear resistant material and
  slit into longitudinally disposed segments capable of radially expanding to decrease the outside diameter of said center section in response to the expansion of said cell.

7. A device according to claim 6 characterized by said device having
  a generally cylindrical intermediate section positioned in axial alignment with and affixed to said body member,
  said intermediate section providing an inner cylindrical wall concentric with said sleeve and sized to slidingly receive the outer periphery of said ring shaped actuating piston, and
  a generally circular cap section axially aligned with and affixed to and closing the outer end of said intermediate section,
  said cap section having a centrally disposed opening through which the rod projects.

8. A device according to claim 7 characterized by
the outer periphery of said sleeve and the inner periphery of said intermediate body section defining a ring shaped space in which said actuating piston is slidably received for sliding movement between
  an outer position abutting the interior surface of said cap section and
  an inner position proximate the outwardly facing surface of said base portion of said body member,
said piston pins being movable between said inner and outer positions in response to movement of said actuating piston between said inner and outer positions.

9. A device according to claim 8 characterized by
at least one housing unit between said cap section and said actuating piston, and
a compression spring disposed in said housing unit under tension whereby said actuating piston is continuously biased by said spring toward its inner position.

10. A device according to claim 9 characterized by
at least three housing units provided between said cap section and said actuating piston, each said housing unit comprising axially aligned circular recesses located in the interior surface of said cap section and the outer surface of said actuating piston,
a compression spring disposed in each of said housing units,
said springs each having essentially the same reactive force to provide substantially even pressure circumferentially around said actuating piston.

11. A device according to claim 10 characterized by
a pressure source,
a pressure port provided in said intermediate body section opening into said ring shaped space proximate the outwardly facing surface of said body portion,
said pressure source being operable to inject fluid into said ring shaped space through said pressure port and between the inner surface of said actuating piston and the outwardly facing surface of said base portion under pressure sufficient to move said actuating piston outwardly in contravention to the pressure of said compression springs.

12. A device according to claim 4 characterized by said bushing having
  a first end flange sized to fit snugly within said aperture and
  a second end flange seated on and secured to the outer end of said sleeve whereby said center section will clamp the rod against both axial and rotative movement.

13. A device according to claim 1 characterized by said central bore of said bushing being non-circular in cross section.

14. A device according to claim 13 characterized by said central bore of said bushing being defined in cross section by four generally straight sides connected by four right angles.

15. A device according to claim 13 characterized by said central bore of said bushing being substantially hexagonal in cross section.

16. A device according to claim 1 wherein said rod is fixed and said device is selectively movable relative to and clampable against movement on said rod.

17. A device according to claim 1 wherein said body member is fixed to a power cylinder having a rod axially aligned with and movable through the body member, said rod being
  movable relative to the power cylinder and said body member upon the simultaneous injection of a fluid pressure into the cylinder and said body member, and
  clamped against movement upon the simultaneous release of fluid pressure from the cylinder and said body member.

18. A device for controlling movement between that device and a rod operatively engaged with that device, comprising
  a body member having
    a generally circular base portion,
    a circular sleeve extending outwardly from said base portion and provided with a centrally disposed cylindrical aperture extending through the device, a bushing disposed within said cylindrical aperture and provided with
  a central bore defining an inner surface through which the rod is coaxially and slidingly received,
  a center section radially deflective between
    an inner position engaging and clamping the rod to stop movement between the rod and said body member and
    an outer position releasing the rod to permit movement between the rod and said body member,
  a liquid impervious radially resilient sleeve covering the outer periphery of said center section,
  the outer surface of said resilient sleeve being spaced from and forming with the inner surface of said cylindrical aperture an annular space,
  seal rings positioned proximate the ends of said bushing and sealingly engaging the inner surface of said cylindrical aperture,
  said annular space between the seal rings comprising a liquid receiving expandable cell,
a hydraulic system for moving said center section between its said outer and inner positions comprising
  said liquid receiving expandable cell,
  three cylinder bores circumferentially spaced in said base portion radially around said sleeve,
  passage means between said cell and each of said cylinder bores,
  a piston pin movable in each of said cylinder bores, and
  a substantially incompressible hydraulic liquid filling said hydraulic system,
  said piston pins being movable simultaneously in said cylinder bores
    toward an inner position generating and transmitting pressure through said hydraulic liquid to expand said cell to move said center section to its inner position to clamp the rod, and
    to an outer position relieving pressure from and permitting contraction of said cell and movement of said center section to its outer position to release the rod,
an actuating piston engaging said piston pins and moving therewith between inner and outer positions, said actuating piston being
  generally ring shaped,
  provided with an inner periphery sized to slide over the outer periphery of said sleeve, and
  provided with an inner end engaged with said piston pins,
a generally cylindrical intermediate body section positioned in axial alignment with and affixed to said body member,
  said intermediate body section providing an inner cylindrical wall concentric with said sleeve and sized to slidingly receive the outer periphery of said ring shaped actuating piston,
a generally circular cap section axially aligned with and affixed to and closing the outer end of said intermediate body section,
  said cap section having a centrally disposed opening through which the rod projects,
  the outer periphery of said sleeve and the inner periphery of said intermediate body section defining a ring shaped space in which said actuating piston is received for sliding movement between
    an outer position abutting the interior surface of said cap section and
    an inner position abutting the outwardly facing surface of said base portion of said body member,
  said piston pins being movable between said inner and outer positions in response to movement of said actuating piston between said inner and outer positions,
means biasing said actuating piston and said piston pins toward said inner position, said biasing means comprising
  at least three housing units provided between said cap section and said actuating piston, each said housing unit comprising an axially aligned circular recesses located in the interior surface of said cap section and the outer surface of said actuating piston,
  a compression spring disposed in each of said housing units,
  said springs each having essentially the same reactive force to provide substantially even pressure circumferentially around said actuating piston, and
means for applying pressure against said actuating piston to move said actuating piston and said piston pins in contravention to said biasing means to their outward position to release the rod for movement, said pressure means comprising
  a pressure source,
  a pressure port provided in said intermediate body section opening into said ring shaped space proximate the outwardly facing surface of said body portion,
  said pressure source being operable to inject fluid into said ring shaped space through said pressure port and between the inner surface of said actuating piston and the outwardly facing surface of said base portion under pressure sufficient to move said actuating piston outwardly in contravention to the pressure of said compression springs.

19. A device according to claim 4 characterized by
said bushing having end flanges of substantially equal outside diameter snugly received within said circular sleeve, and
means for restraining said bushing against axial movement within said circular aperture.

20. A device according to claim 19 wherein said restraining means comprises a ring member mounted in the inner wall of said circular sleeve contiguous with each end of said bushing.

* * * * *